(12) United States Patent
Or Igelka et al.

(10) Patent No.: US 8,671,456 B2
(45) Date of Patent: Mar. 11, 2014

(54) ACCESSING RESTRICTED RESOURCES IN COMPUTER PROGRAMMING

(75) Inventors: Or Or Igelka, Ramat-Gan (IL); Eyal Sinai, Kfar Saba (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 13/532,813

(22) Filed: Jun. 26, 2012

(65) Prior Publication Data
US 2013/0347124 A1 Dec. 26, 2013

(51) Int. Cl.
- G06F 7/04 (2006.01)
- H04L 9/32 (2006.01)
- G06F 12/14 (2006.01)
- G06F 21/00 (2013.01)

(52) U.S. Cl.
USPC ............. 726/27; 726/31; 713/168; 713/187; 705/57

(58) Field of Classification Search
USPC ................ 726/27, 31; 713/168, 187; 705/57
See application file for complete search history.

(56) References Cited

U.S. PATENT DOCUMENTS

| | | | |
|---|---|---|---|
| 5,784,620 A | 7/1998 | Isham | |
| 5,794,044 A | 8/1998 | Yellin | |
| 6,986,144 B2 | 1/2006 | Krivoruchko | |
| 7,668,862 B2 | 2/2010 | Hoennig | |
| 2005/0050341 A1* | 3/2005 | Liang | 713/190 |
| 2007/0112680 A1* | 5/2007 | van Niekerk et al. | 705/57 |
| 2008/0022260 A1 | 1/2008 | Kinder et al. | |
| 2012/0198476 A1* | 8/2012 | Markuza et al. | 719/318 |

* cited by examiner

Primary Examiner — Aravind Moorthy
(74) Attorney, Agent, or Firm — Soroker-Agmon (57) ABSTRACT

A computerized method for providing a computer code an access to a restricted resource of a computer program, comprising modifying an at least one duplicate of an at least one declaration file of the computer program by removing a restriction definition of an at least one resource of the computer program that is referred to by the computer code, thereby generating an at least one modified declaration file, and building a computer application comprising the computer code and also the computer program as being dependent on the at least one modified declaration file, thereby providing access to the at least one resource originally defined as restricted, and an apparatus for performing the same.

7 Claims, 4 Drawing Sheets

ACCESSING RESTRICTED RESOURCES IN COMPUTER PROGRAMMING

BACKGROUND

The present disclosure generally relates to object-oriented programming, and more specifically to accessing resources of object-oriented programs.

Programs developed by object-oriented languages such as C++, Visual C#®.NET (Microsoft Inc.) or Java™ (Oracle Inc.) may have, and generally have, resources such as variables, objects or functions which are protected from accessing by other resources.

Thus, a test code for accessing resources of a program during execution is denied access to private or protected resources, thereby decreasing a functionality and objective of the test code.

Methods were developed to enable access to private or protected resources, such as in the following publications.

U.S. Pat. No. 6,986,144 reports accessing by an instance of a first class to a selected protected resource of an instance of a second class by defining a third class that includes a protected virtual method for accessing the selected protected resource.

US Application 2008/0022260 reports accessing by an extension identifying an internal state that may be exposed via accessor methods.

U.S. Pat. No. 5,794,044 reports a modified interpreter that uses special "privileged" load and store instructions that access private variables and constants outside the method being executed.

U.S. Pat. No. 7,668,862 reports a method based on associating an access-token with a caller object which is to be allowed to access a restricted method and sharing this access-token with the resource object.

U.S. Pat. No. 5,784,620 reports a system that includes a base class and a related derived class and a state selector class that provides state selection to the base class where each operational object includes an internal object having a pair of internal states.

SUMMARY

One exemplary embodiment of the disclosed subject matter is a computerized method for providing a computer code an access to a restricted resource of a computer program, comprising modifying an at least one duplicate of an at least one declaration file of the computer program by removing a restriction definition of an at least one resource of the computer program that is referred to by the computer code, thereby generating an at least one modified declaration file, and building a computer application comprising the computer code and also the computer program as being dependent on the at least one modified declaration file, thereby providing access to the at least one resource originally defined as restricted.

Yet another exemplary embodiment of the disclosed subject matter is a method for a computerized apparatus for providing a computer code an access to a restricted resource of a computer program, comprising an at least one processor, and at least one storage device, wherein the computerized apparatus is configured for modifying an at least one duplicate of an at least one declaration file of the computer program by removing a restriction definition of an at least one resource of the computer program that is referred to by the computer code, thereby generating an at least one modified declaration file and for building a computer application comprising the computer code and also the computer program as being dependent on the at least one modified declaration file, thereby providing access to the at least one resource originally defined as restricted.

The context and terms of the present disclosure, without limiting and unless otherwise specified, refer to programming of computer programs as known, for example, in the art.

Generally in the present disclosure, and as known in the art, a program or code is stated or encoded in one or more computer files, or source files, and executed by a processor according to representations of computer executable instructions in the source files, where, optionally, the source files include definitions and/or declarations, optionally in separate files, that do not necessarily represent executable instructions at all.

For brevity and clarity and without limiting, in the present disclosure a source file that includes representations of computer executable instructions is referred to as a 'code file' or 'implementation file', whereas a file that include declarations is referred to as a 'declaration file' or a 'header file' or a 'header'. Code files that are affected by the declarations are also referred to as dependent on the corresponding declarations files.

Taking C++ as an example, 'cpp' files are code files and 'h' or 'hpp' files are declaration files.

In the context and terms of the present disclosure, without limiting, as known in the art the term 'build' denotes the necessary operations to convert a source file into a program code executable by a processor. For example, by compiling and linking.

In the context of the present disclosure, without limiting, a resource of a program denotes any one of an object, a variable, a constant, or a function and/or any other data or a combination thereof, wherein an object is an instance of a class or a structure and a function denotes a subroutine or a procedure as known in the art.

In the context of the present disclosure, without limiting, accessing, modifying, or probing a resource implies reading and/or writing a data of a resource, and/or invoking or calling a function.

In the context of the present disclosure, without limiting, a restricted resource denotes a resource to which an access from another resource and/or a program or a code section is not allowed or otherwise restricted.

For example, in C++ a 'private' variable is a variable which can only be accessed from within the class in which it is defined, and a 'protected' variable is a variable which can only be accessed from within the class in which it is defined, or within the context of a class which inherits from the class in which the protected variable is defined, while a 'public' variable can be freely and globally accessed without any restrictions. Likewise, for example, in C++ a 'private' function is a function which can only be called from within the class in which it is defined, and a 'protected' function is a function which can only be called from within the class in which it is defined, or within the context of a class which inherits from the class in which the protected function is defined, while a 'public' function can be freely and globally called without any restrictions.

For brevity, a non-restricted resource is generally also denoted as a public one.

For brevity and clarity and without limiting, in the present disclosure referring to a restriction or an access restriction or a restricted resource imply any kind of an access restriction imposed on a resource or any kind of a restricted resource, accordingly, unless otherwise specified or is evident in the context in which the term appears.

In the context of the present disclosure, without limiting, a 'restriction qualifier' denotes one or more terms and/or phrases that define and/or establish and/or regulate or impose access restriction on a resource. In some cases the restriction qualifier is implicit such as when the access restriction is a default one. For example, in C++, a 'private' qualifier may be implicit and qualified as such by default. For brevity, a restriction qualifier is also denoted as a 'qualifier'.

For brevity and clarity and without limiting, in the present disclosure a 'project' denotes a program of one or more source files, possibly including also one or more libraries, for carrying out a specific mission on a computer. The project is referred to either before compilation and/or linking or after compilation and/or linking, wherein the project is defined and/or programmed according to an object-oriented scheme such as by object-oriented programming languages, as known in the art, for example, C++ programming language.

In the context of some embodiments of the present disclosure, without limiting, an 'object file' is a product of a compilation of a code file, as for example, known in the art, and does not relate to the term 'object' as a resource or to the concepts of object-oriented programming.

For brevity and clarity and without limiting, in the present disclosure a 'test program' or a 'test code' is a program combined with the project and/or operative with the project, such as by APIs, and refers to or probes or accesses resources of the project. For brevity and clarity and without limiting the combined and/or cooperating project and test code is referred to as a 'test application'.

For brevity and clarity and without limiting, in the present disclosure a 'utility' or a 'utility program' denotes a supplementary or an ancillary computer program outside the scope of the project and/or the test program.

In the context of some embodiments of the present disclosure, without limiting, referring to actual operation implies also a capability for the operation. For example, 'executed' or 'executing' implies also 'executable'.

The terms cited above denote also inflections and conjugates thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar items or variants of items, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

One technical problem dealt by the disclosed subject matter is accessing resources of a computer program by a computer code from which access to said resources is restricted.

One technical solution according to the disclosed subject matter is a computerized apparatus such as a computer configured for identifying restricted resources to which the computer code refers and modifying and/or setting the qualifiers of the identified resources such that the restrictions are removed and/or qualified as unrestricted, and that without affecting the original source files and/or the behavior and/or the functionality of the original program.

Preferably without limiting, in some embodiments, the identification and/or modification of qualifiers is carried out by a utility program executed on a processor. Preferably without limiting, in some embodiments, the identification and/or modification of qualifiers is carried out automatically by the utility program.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

For brevity and clarity, the computer program and the computer code cited above are considered and referred to as a project and a test program, respectively.

In some embodiments, a method according to the present disclosure includes the following operations:

Automatically determining resources referred to in the test program where the resources are defined or qualified as restricted in the declaration files of the project, thus identifying the declarations files in which the restricted resources are defined.

Modifying duplicates of the identified original declaration files of the project by removing the restrictions from the determined resources.

Compiling the code files of the project depending on the modified duplicates of the declaration files of the project, and compiling the code files of the test program, so that the identified resources may be freely and unrestrictedly accessed by the test program.

In case the project includes libraries files that depend on the modified declaration files then the respective code files of the libraries are compiled as well.

Building a test application combining the project and the test program, so that consequently the test program refers to the resources as unrestricted resources that can be accessed or probed during the execution of the application.

In the operations items are referred to in the plural, but according to the case singular reference is implied. Also, in some embodiments, the compiling and building may be combined into one building operation.

It is noted that the test application can be executed and tested where the project is fully functional with no additional data constructs or code.

It is also noted that the original source files, declaration files and code files, remain intact so that the project can be built anew, for instance responsively to findings of the test.

The methods according to the present disclosure, such as the method exemplified above, are carried out on a computerized apparatus configured to perform the methods, for example, by installing suitable programs and tools and storing files of the project and the test program.

In some embodiments, declaration files that are determined to be modified for removing restrictions are copied and subsequently amended, thus preserving the original declaration files. The declaration files may be copied to a separate location with respect to the location of the original files and/or the original files may be renamed to preserve the contents thereof. The copied declaration files are also referred to as 'duplicate' or 'copied' or 'local' for distinction relative to the original declaration files.

Essentially, the code files of the project are not modified or affected, though resultant files thereof, such as object files after a compilation, are different with respect to restrictions of resources according to the modified declaration files.

Generally, without limiting, the description and discussion below refer to C++ programming and terms, without precluding other programming languages such as, for example, Visual C#®.NET (Microsoft Inc.) or Java™ (Oracle Inc.).

In the following discussion, reference to cpp files without specifying the particular names implies cpp code files according to the disclosed context, and likewise reference to hpp files or header files or headers without specifying the particular names implies hpp declarations files according to the disclosed context. Likewise, for brevity and clarity without impairing consistencies, when particular names of files are cited, the term file is not necessarily included.

In some embodiments, in order to analyze what resource and files are affected and need to be modified and/or compiled, three utilities or corresponding functionalities are coded and/or provided.

A first utility, scans the files of the test code to identify references to restricted resources in the project, and generates a list of header files of the project which include definitions of restricted resources, the list stored in a document such as a text file denoted, for example, as 'h_files_to_patch'.

A second utility scans the code files of the project to determine which code files depend on headers in h_files_to_patch, and generates a list of the dependent code files in a document such as a text file denoted, for example, as 'affected_cpps'.

In case static libraries are included in the project, a third utility identifies which CPP files of the libraries depend on headers listed in h_files_to_patch, and generates a list of the identified libraries in a document such as a text file denoted, for example, as 'affected_libs'.

Another utility, denoted, for example, as a 'Patcher', patches or modifies local copies of the headers listed in h_files_to_patch to qualify restricted resources as 'public' in the local header files.

In some embodiments, the documents as described above are placed or stored in a location or locations in a storage device. For brevity and clarity, without limiting, the location or locations of the documents is generally referred to as a local location, as exemplified in local partition with respect to FIG. 1A-1C.

In some embodiments, all the utilities and/or the functionalities thereof are combined in one utility program. Optionally or alternatively, the analyzing utilities—namely, the first utility, the second utility and the third utility—and/or functionalities thereof are combined in a single utility denoted, for example, as a 'Static Dependencies Analyzer'. Optionally or alternatively, any two or more utilities or functionality thereof are combined.

By way of example and without limiting, in the description below the Static Dependencies Analyzer and the Patcher are referred to as well as the documents examples described above, unless otherwise specified.

Figure 1A:
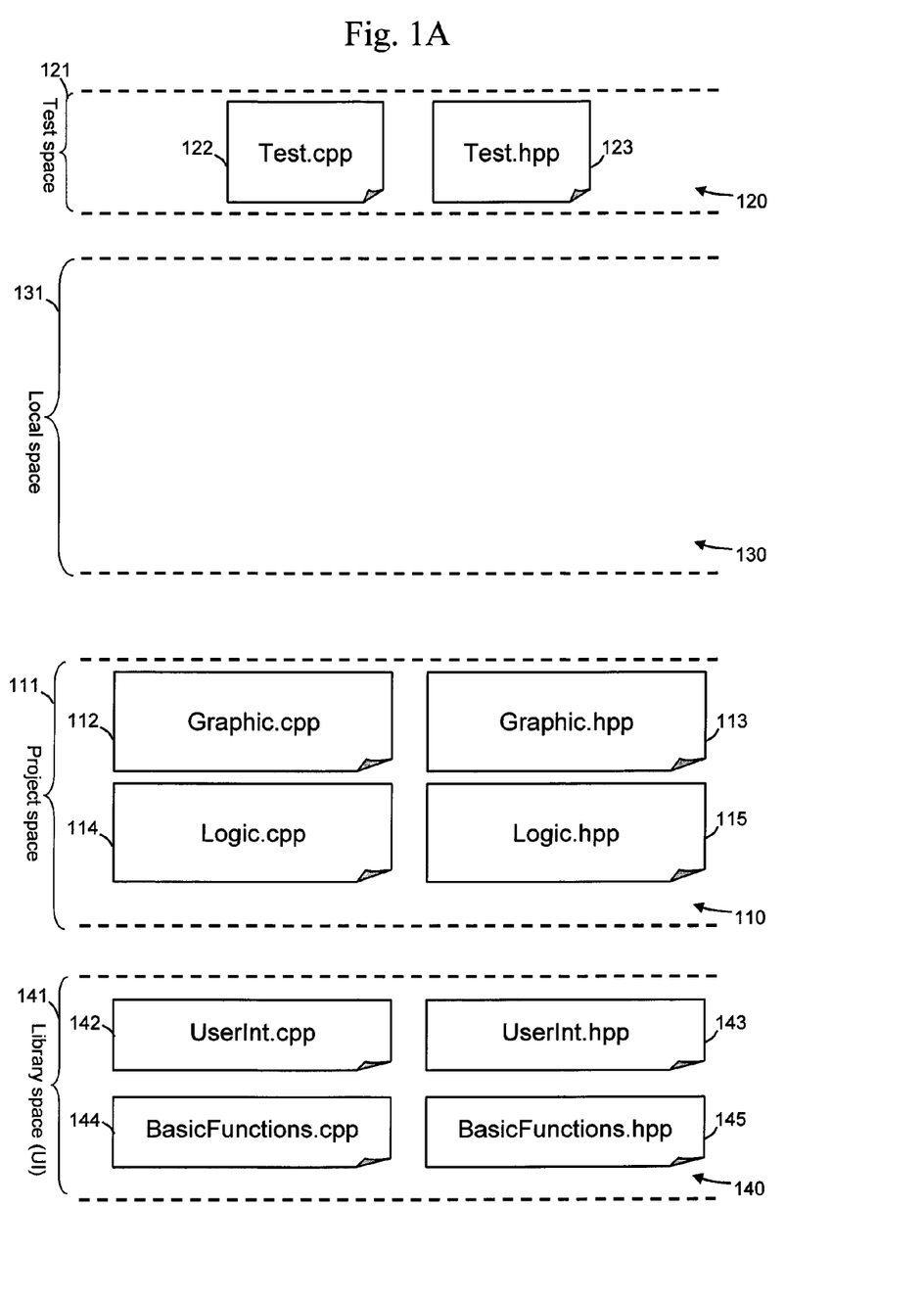
FIG. 1A schematically illustrates partitions and representative exemplary files, according to exemplary embodiments of the disclosed subject matter.

FIG. 1A schematically illustrates partitions and representative exemplary files, according to exemplary embodiments of the disclosed subject matter.

The partitions are denoted also as spaces, optionally defined as separate folders on a storage device or by any other method of the art. For example, different partitions of a storage device, or different storage devices, or virtually or logically distinguished by the file names, or by any combination thereof.

In some embodiments, the partitions or spaces are listed and described below.

A project space, denoted as a project space 110, as indicate by a bracket 111, includes exemplary representative files for building a project, namely:

A Graphic.cpp file and a Graphic.hpp file, denoted as a cpp file 112 and a hpp file 113, respectively, for handling graphics on a screen.

a Logic.cpp file and a Logic.hpp file, denoted as a cpp file 114 and a hpp file 115, respectively, for handling internal logic.

A library space, denoted as a library space 140, as indicate by a bracket 141, includes exemplary representative files for building a library such as for a common support for various projects, namely:

A UserInt.cpp file and a UserInt.hpp file, denoted as a cpp file 142 and a hpp file 143, respectively, for providing support for programming a user interface. As an example, UserInt.cpp file relate to a static library, as opposed to a dynamically loaded library, and denoted as UI.lib which comprises an object file UserInt.obj corresponding to UserInt.cpp.

Additionally, as an exemplary generalization of a library that includes some files that do not use and/or depend on restricted resources, library space 140 includes a BasicFunctions.cpp file and a BasicFunctions.hpp file, denoted as a cpp file 144 and a hpp file 145, respectively, for providing some basic functionality and/or support for UI.lib.

It is noted that when UI.lib is generated or built, such as described below for accessing restricted resource, all the files of UI.lib are used for consistency of the definitions and allocations of the resource of UI.lib. Namely, according to the example, UserInt.cpp file and BasicFunctions.cpp file, together with the respective headers UserInt.hpp file and BasicFunctions.hpp.

Library space 140 can be considered as belonging to project space 110, but since a library may be shared among various different projects then library space 140 is discussed, at least partially, separately from project space 110.

A test space, denoted as a test space 120, as indicate by a bracket 121, includes exemplary representative files for building a test application with the project, namely:

Test.cpp file and a Test.hpp file, denoted as a cpp file 122 and a hpp file 123, respectively, for testing the project.

A local space, denoted as a local space 130, as indicate by a bracket 131, is used as a work partition, akin to a 'sand box', as described further below.

Test.cpp comprises, for instance, code exemplified in a pseudocode mimicking computerized operations, as for example, in Table-1 below.

TABLE 1

Access the value of UserInt::private_ui
Verify that Graphic::public_screenwidth is larger than 1024
Verify that Logic::protected_sumdivider not equals 0

Operations of the Static Dependencies Analyzer are performed as exemplified below, yet not necessarily in the described order and where some operations may be combined and/or are implicit.

The Static Dependencies Analyzer generally refers to source files in project space 110 and library space 140.

An initial operation is establishing which restricted resources of the project are referred to by Test.cpp by analyzing the header files of the project and identifying in which headers the resources are qualified, either explicitly of implicitly, as restricted resources. As an example, Logic.hpp and UserInt.hpp are identified as the header files in which the resources protected_sumdivider and private_ui are defined as restricted resources, respectively, where Logic.hpp comprises definitions as exemplified in Table-2 and UserInt.hpp comprises definitions as exemplified in Table-3 below.

TABLE 2

```
class Logic {
protected:
int protected_sumdivider;
...
}
```

TABLE 3

```
class UserInt {
private:
char *private_ui;
...
}
```

In the examples of Table-2 and Table-3 the ellipsis ( . . . ) indicates possible further definitions, assuming, for brevity and clarity, that the possible further definitions are public ones and that the possible further definitions may include functions as well.

Consequently a list comprising the names of UserInt.hpp and Logic.hpp is generated and stored in a document h_files_to_patch as shown, for example, in Table-4 below representing document h_files_to_patch.

TABLE 4

Logic.hpp
UserInt.hpp

Having established which headers have to be modified as listed in document h_files_to_patch, the cpp files in project space 110 and library space 140 that use the listed headers are identified, for example, Logic.cpp and UserInt.cpp. Accordingly, a list comprising the names of Logic.cpp and UserInt.cpp is generated and stored in a document affected_cpps as shown, for example, in Table-5 below representing document affected_cpps.

TABLE 5

Logic.cpp
UserInt.cpp

According to the list in document affected_cpps, a list is generated which includes names of libraries from library space 140 which comprise object files created by the compilation of cpp files from affected_cpps. The generated list is stored in a document affected_libs. According to the example, the library UI is identified, as shown, for example, in Table-6 below representing document affected_libs.

TABLE 6

UI.lib

The list in document affected_cpps, together with the cpp files which were identified to generate object files of the library UI are gathered to generated a list stored in a document cpps_to_rebuild as shown, for example, in Table-7 below representing document cpps_to_rebuild.

TABLE 7

Logic.cpp
UserInt.cpp
BasicFunctions.cpp

Having listed in document h_files_to_patch which header files have to be modified to remove restrictions of resources defined therein, the respective header files are copied from project space 110 and/or library space 140 to local space 130.

Figure 1B:
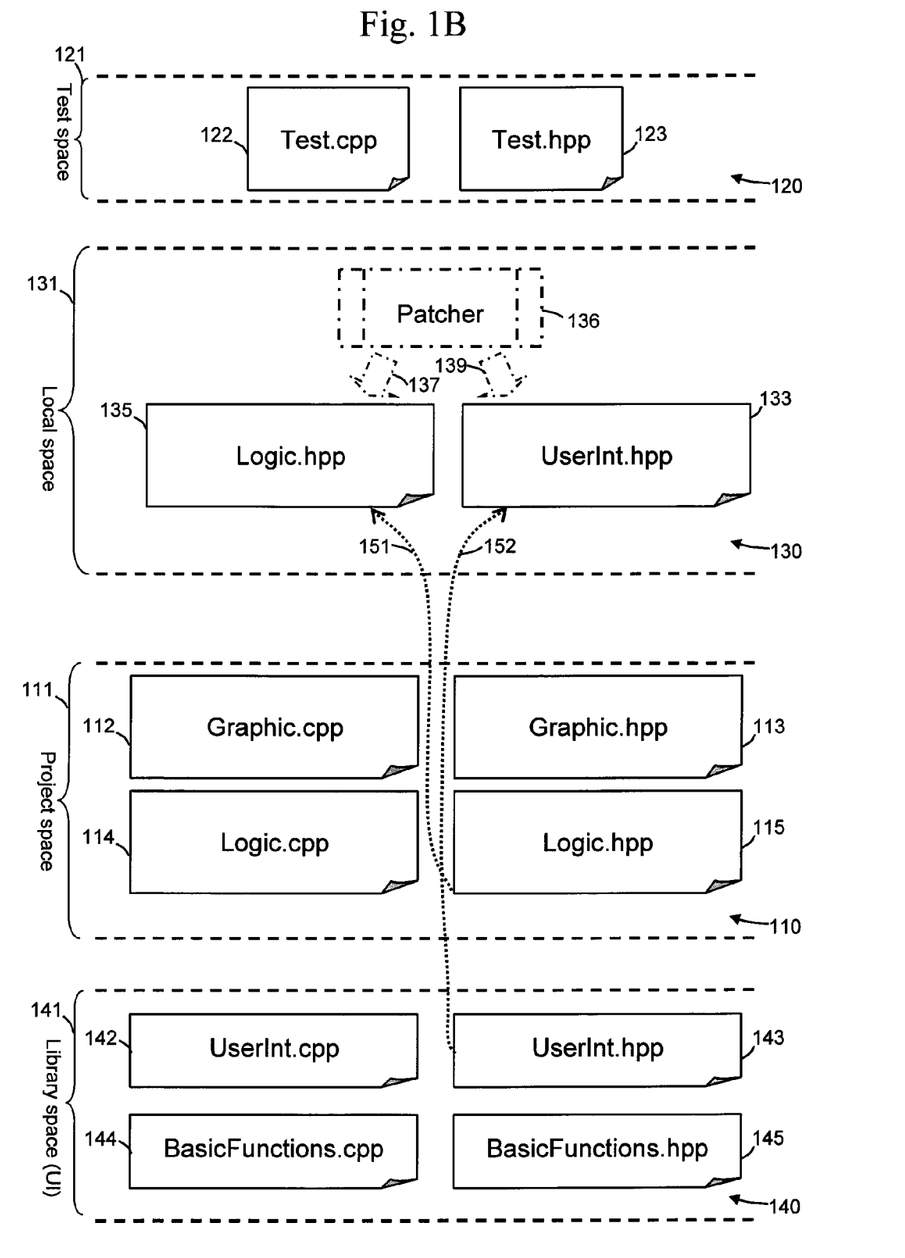
FIG. 1B schematically illustrates partitions and representative exemplary files and copied header files indicated to be modified by a patching functionality, according to exemplary embodiments of the disclosed subject matter.

FIG. 1B schematically illustrates partitions and representative exemplary files and copied header files as listed in document h_files_to_patch, the header files indicated to be modified by a patching functionality as a Patcher utility 136, according to exemplary embodiments of the disclosed subject matter.

A dotted arrow 151 indicates that Logic.hpp was copied from project space 110 to local space 130, and dotted arrow 152 indicates that UserInt.hpp was copied from library space 140 to local space 130, respectively; the copied Logic.hpp is also denoted as a hpp file 135 and the copied UserInt.hpp is also denoted as a hpp file 133, where the dashed-dotted arrows 137 and 139 indicate that Patcher utility 136 modifies the header files.

Invoking the Patcher, the restrictions in the copied Logic.hpp and UserInt.hpp, namely, hpp file 135 and hpp file 133, respectively, are removed for the identified restricted resources, as exemplified by resources private_ui and protected_sumdivider.

Consequently, after the operation of Patcher utility 136, Logic.hpp and UserInt.hpp, denoted for clarity without necessarily changing the respective file names, as Logic.hpp* and UserInt.hpp*, respectively, comprise definitions as exemplified in Table-8 and Table-9 below, respectively.

TABLE 8

```
class Logic {
// protected:
public:
int protected_sumdivider;
...
}
```

TABLE 9

```
class UserInt {
// private:
public:
```

TABLE 9-continued

```
char *private_ui;
...
}
```

In the examples of Table-8 and Table-9, as opposed to corresponding examples of Table-2 and Table-3, the restrictions, namely 'protected' and 'private', were removed by commenting-out the restriction qualifiers and replacing by 'public' qualifiers. Optionally, other methods may be used such as adding 'public' qualifiers after the 'protected' and 'private' qualifiers so that the restrictions are overridden, or directly replacing 'private' and 'protected qualifier with 'public' qualifiers without commenting out.

Figure 1C:
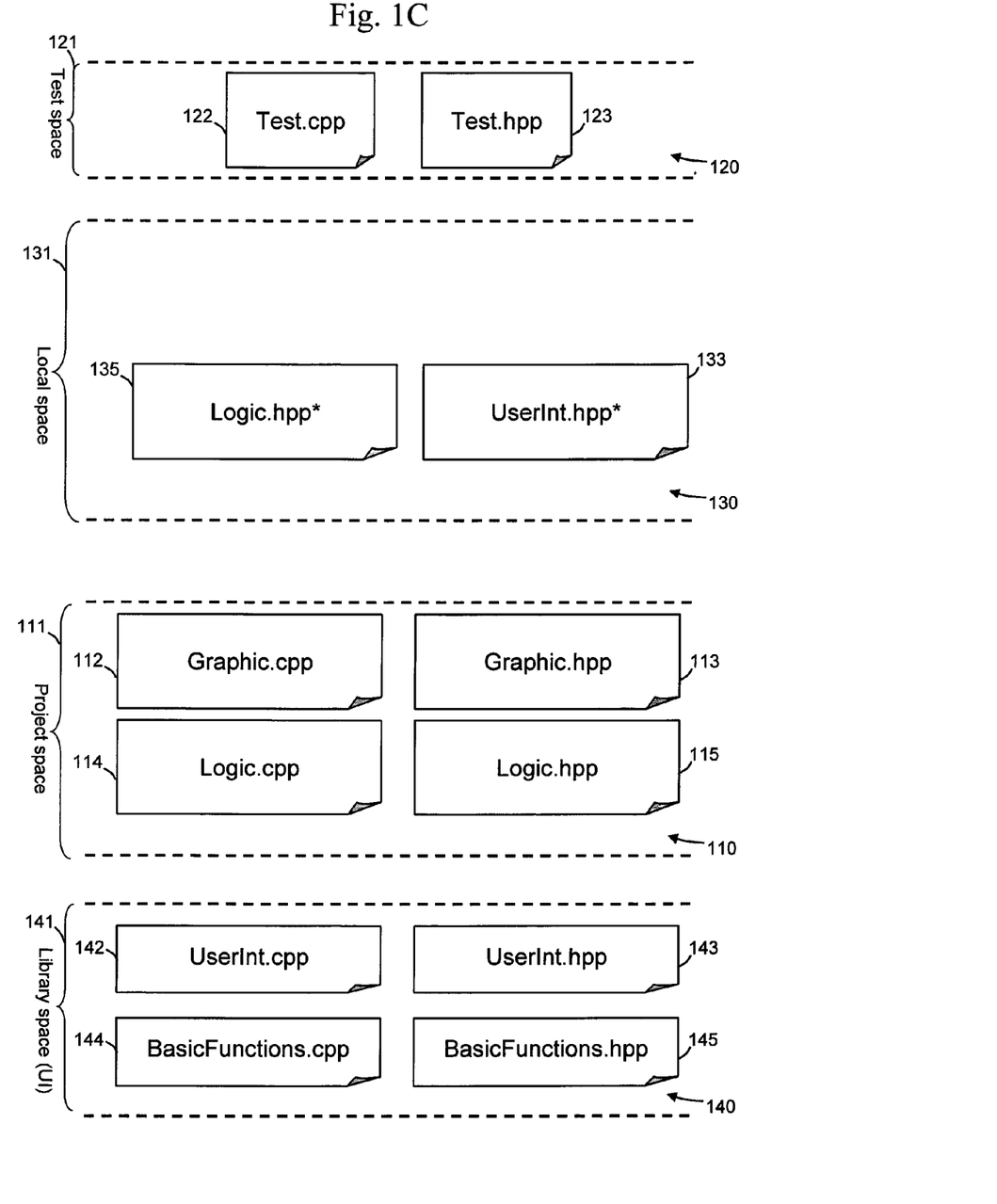
FIG. 1C schematically illustrates partitions and representative exemplary files and modified copied header files, according to exemplary embodiments of the disclosed subject matter.

FIG. 1C schematically illustrates partitions and representative exemplary files and copied header files modified by Patcher utility 136, according to exemplary embodiments of the disclosed subject matter.

Once the headers are modified by removing restrictions of the identified resources, the cpp files listed in document cpps_to_rebuild are compiled using the exemplified modified headers Logic.hpp* and UserInt.hpp*, correspondingly, together with the test source files as exemplified by Test.cpp file and Test.hpp file, thereby generating respective object files for the project, the libraries, and the test files.

Subsequently, the object files are linked, optionally with libraries that were not affected by the modified header and possible object files that were not affected by the modified qualifiers, that is, possible libraries that are not referenced in document affected_libs and possible obj files which were created by compiling cpp files that do not correspond to files listed in cpps_to_rebuild, thereby generating a test application.

The generated test application can reference globally and unconstraintly the originally restricted resources while the project is fully functional and other restricted resources are kept restricted. Thus, the project is minimally affected only by the tested resources that can be probed with no restriction constraint.

In some embodiments, the test application, optionally using functionalities of the Static Dependencies Analyzer and the Patcher, is generated automatically.

For example, in some embodiments, a Make file or makefile with appropriate entries for the modified header files and/or calls for the Static Dependencies Analyzer and the Patcher is used, so that the operations for copying and modifying the header files as well as compiling and linking are carried out automatically. Optionally, a section or all the original Make file of the project is copied to and/or referenced by the Make file used to build the test application. In some embodiments, except possibly for the modified files, the other files participating in generation of the test application are used in or from the original respective location, or spaces, thereof.

Optionally, in some embodiments, other methods are used. For example, a batch file, or an application, that performs and/or invokes the functionalities of the Static Dependencies Analyzer and the Patcher and optionally also the compilation and linking are used.

It is noted that the file names and contents and functionalities described above are provided as examples and represent, without limiting, other file names and/or contents and/or functionality.

It is also noted that the disclosed subject matter and/or variations thereof does not preclude other programming languages and/or environments. For example, programming suits that do not use headers but define the restriction of resources in a different manner, such as Java™ (Oracle Inc.), or other programming suits such as scripts.

Figure 2:
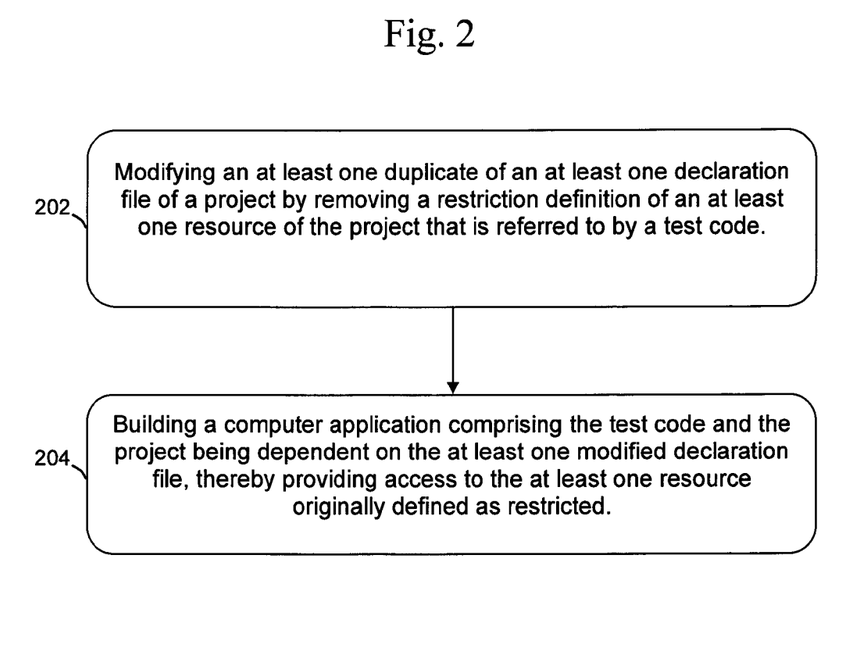
FIG. 2 outlines operation for allowing a test code to access restricted resources of a project, according to exemplary embodiments of the disclosed subject matter.

FIG. 2 outlines operation for allowing or providing for a test code to access restricted resources of a project, according to exemplary embodiments of the disclosed subject matter.

In some embodiments, optionally as a preliminary operation, a resource or resources of a project that are referred to in a test program are determined, the resources defined as restricted in declaration files of the project, and consequently and/or thereby identifying the corresponding declaration files in which the restricted resources of the project are defined.

In some embodiments, the determination and identification are carried out by a utility program that analyzes what restricted resources of the project that are referred to by the test program and identifies the declaration files in which the restricted resources are defined.

In operation 202 an at least one duplicate and/or a plurality of duplicates of an at least one declaration file and/or corresponding duplicates of a plurality of declaration files of the project is and/or are modified by removing a restriction definition of an at least one resource and/or resources of the project that is and/or are referred to by a test code.

In some embodiments, the modification is carried out by a utility program that removes the restrictions by adding, for example, a 'public' qualifier.

In operation 204 a test application comprising the test code and the project being dependent on the at least one modified declaration file and/or a plurality of declaration files is built, the test application is thereby provided with access to the at least one resource and/or plurality of resources originally defined as restricted.

Phrased differently or alternatively, in operation 204 the code files of the project which depend on the modified declaration files of the project, together with the source files of the test program, are built, generating a test application so that the determined resources originally defined or qualified as restricted may be unrestrictedly accessed by the test program in the test application.

Generally, the test program is built by compiling the code files of the project as depending on the modified declaration files as well as the code files of the test program, and subsequently linking the resultant object files.

In some embodiments, the project files comprise one or more static libraries that are built in case the source files of the libraries depend on the identified declaration files.

In some embodiments, there may be residual object files of the project and/or libraries. The compilation generates new object files for code files that depend on the modified declaration files, overriding the corresponding residual object files. Subsequently, the test application is generated by linking the residual object files that were not overridden as well as the new object files.

In some embodiments, the utilities are separate programs. Optionally, the utilities or functionalities thereof are combined in one program. Optionally or alternatively, the utilities or functionalities thereof are partly combined and partly separated.

In some embodiments, by invoking the utilities and/or functionalities thereof then organization or setup of the project for accessing restricted resources by the test program is carried out automatically.

In some embodiments, the operations described above are carried out by a computerized apparatus such as one or more computers having one or more storage devices and one or more processors. The computerized apparatus is configured, such as by suitable programs and/or utilities and/or files, to carry out the operations.

There is thus provided according to the disclosed subject matter a computerized method for providing a computer code an access to a restricted resource of a computer program, comprising modifying an at least one duplicate of an at least one declaration file of the computer program by removing a restriction definition of an at least one resource of the computer program that is referred to by the computer code, thereby generating an at least one modified declaration file, and building a computer application comprising the computer code and also the computer program as being dependent on the at least one modified declaration file, thereby providing access to the at least one resource originally defined as restricted.

In some embodiments, the at least one declaration file is identified consequently to determining the at least one resource of the computer program where the at least one resource is referred to in the computer code and defined as restricted in the at least one declaration file of the computer program.

In some embodiments, the computerized method is carried out automatically on a computer.

In some embodiments, the computerized method is carried out, at least partially, by an at least one computer utility program.

In some embodiments, the original source files of the computer program are preserved.

There is yet further provided according to the disclosed subject matter a computerized apparatus for providing a computer code an access to a restricted resource of a computer program, comprising an at least one processor, and at least one storage device, wherein the computerized apparatus is configured for modifying an at least one duplicate of an at least one declaration file of the computer program by removing a restriction definition of an at least one resource of the computer program that is referred to by the computer code, thereby generating an at least one modified declaration file and for building a computer application comprising the computer code and also the computer program as being dependent on the at least one modified declaration file, thereby providing access to the at least one resource originally defined as restricted.

In some embodiments, the computerized apparatus is configured for automatic operation.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in a different order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term 'configuring' and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for providing a computer code an access to a restricted resource of a computer program, comprising:

modifying an at least one duplicate of an at least one declaration file of the computer program by removing a restriction definition of an at least one resource of the computer program that is referred to by the computer code, thereby generating an at least one modified declaration file; and building a computer application comprising the computer code and also the computer program as being dependent on the at least one modified declaration file, thereby providing an access to the at least one resource originally defined as restricted, wherein the computerized method is performable on a computerized apparatus configured to carry out the computerized method.

2. The computerized method according to claim 1, wherein the at least one declaration file is identified consequently to determining the at least one resource of the computer program where the at least one resource is referred to in the computer code and defined as restricted in the at least one declaration file of the computer program.

3. The computerized method according to claim 1, wherein the computerized method is carried out automatically on a computer.

4. The computerized method according to claim 1, wherein the computerized method is carried out, at least partially, by an at least one computer utility program.

5. The computerized method according to claim 1, wherein original source tiles of the computer program are preserved.

6. A computerized apparatus for providing a computer code an access to a restricted resource of a computer program, comprising:

an at least one processor;

and at least one storage device;

wherein the computerized apparatus is configured for modifying an at least one duplicate of an at least one declaration file of the computer program by removing a restriction definition of an at least one resource of the computer program that is referred to by the computer code, thereby generating an at least one modified declaration file and for building a computer application comprising the computer code and also the computer program as being dependent on the at least one modified declaration file, thereby providing an access to the at least one resource originally defined as restricted.

7. The computerized apparatus according to claim 6, wherein the computerized apparatus is configured for automatic operation.

* * * * *